United States Patent [19]

McKay et al.

[11] 3,776,749

[45] Dec. 4, 1973

[54] DIARYLIDE PIGMENT COMPOSITIONS

[75] Inventors: Robert Bruce McKay, Kilmarnock; Gordon Frank Bradley, Paisley, both of Scotland

[73] Assignee: Ciba-Geigy AG, Basle, Switzerland

[22] Filed: May 6, 1971

[21] Appl. No.: 141,004

[30] Foreign Application Priority Data

May 6, 1970 Great Britain.................... 21,754/70

[52] U.S. Cl. ........................................... 106/288 Q
[51] Int. Cl............................................ C08h 17/44
[58] Field of Search............ 106/288 Q, 309, 308 Q, 106/308 M; 260/180–183

[56] References Cited
UNITED STATES PATENTS 2,309,982  2/1943  Reynolds........................ 106/308 M
3,529,984  9/1970  Bandel et al..................... 106/288 Q

FOREIGN PATENTS OR APPLICATIONS 1,138,465  1/1969  Great Britain.................. 106/288 Q

*Primary Examiner*—Delbert E. Gantz
*Attorney*—Wenderoth, Lind & Ponack

[57] ABSTRACT

A process in which a diarylide pigment composition is produced by coupling a tetrazotised pigment benzidine with a pigment coupling agent, preferably an acetoacetarylamide, and incorporating in the pigment a water-soluble coupled diarylide dyestuff, preferably prior to the isolation and drying of the pigment, and the diarylide pigment composition having better colour strength and transparency properties than conventional diarylide pigments when incorporated in printing inks.

44 Claims, No Drawings

DIARYLIDE PIGMENT COMPOSITIONS

This invention relates to pigment compositions, and is particularly concerned with the preparation of diarylide pigment compositions. Diarylide pigments are also known as benzidine pigments, but the former nomenclature is preferred according to modern usage.

The so-called benzidine yellow pigments are azo compounds, prepared by coupling tetrazotised 3:3'-dichlorobenzidine itself or a tetrazotised benzidine bearing further substituents in the aromatic nuclei with a coupling agent which is an acetoacetarylamide. Normally 3:3'-dichlorobenzidine itself is used, but other substituted benzidines can be used; for example, pigments have been prepared from tetrachlorobenzidines. Examples of coupling agents which have been used are acetoacetanilide, acetoacet-o-toluidide, acetoacet-p-toluidide, acetoacet-o-anisidide, acetoacet-o-chloranilide and acetoacet-2,4-xylidide.

The so-called benzidine orange pigments are prepared in analogous manner by coupling tetrazotised 3:3'-dichlorobenzidine with a coupling agent which is a 3-methyl-5-pyrazolone additionally substituted in the 1 position with a phenyl substituent which itself can bear up to five substituent groups such as alkyl,aryl,alkoxy or halogen groups. Other diarylide pigments may be prepared by coupling tetrazotised derivatives of non-chlorinated benzidines with coupling agents. One example of such a non-chlorinated benzidine which may be coupled to form a pigment is dianisidine, 3:3'-dimethoxy benzidine.

We have now discovered how to prepare diarylide pigment compositions which have better colour strength and transparency properties than conventional diarylide pigments when incorporated in printing inks. According to the invention, we prepare diarylide pigment compositions by coupling a tetrazotised pigment benzidine with a pigment coupling agent, and we incorporate in the pigment a water-soluble dyestuff; normally this will be a coupled diarylide dyestuff, but other classes of dyestuff, such as monoazo dyestuffs or even dyestuffs such as Diphenyl Chrysoin which are not even azo dyestuffs, can be used. In this specification, we use the terms pigment benzidine and pigment coupling agent merely to differentiate the compounds forming the pigment from the compounds which are used to form the dyestuff.

The incorporation of the dyestuff may be carried out in a number of ways; in one process, we use a stoichiometric excess of the pigment coupling agent over the tetrazotised pigment benzidine, and we add a minor proportion of one or more tetrazotised sulphonated benzidines or tetrazotised carboxylated benzidines to the tetrazotised pigment benzidine before the coupling, or to a portion of the pigment coupling agent before the coupling or to the reaction mixture during or after the coupling, preferably prior to the isolation and drying of the pigment.

In another process, we may use a stoichiometric excess of the tetrazotised pigment benzidine over the pigment coupling agent, and add a minor proportion of one or more coupling agents containing water-solubilising functional groups to the pigment coupling agent before the coupling, or to a portion of the tetrazotised pigment benzidine before the coupling or to the reaction mixture during or after the coupling.

The desired modification of the properties of diarylide pigments may also be achieved, according to the invention, by adding one or more soluble dyestuffs to the tetrazotised pigment benzidine before the coupling or to a portion of the pigment coupling agent before the coupling or to the reaction mixture during or after the coupling, or to the previously prepared diarylide pigment, or by conducting the coupling of the pigment in a solution of such a soluble dyestuff. In such cases, the coupling agent of the dyestuff need not be the same as the coupling agent in the pigment itself, nor need the respective tetrazotised benzidines be the same; indeed the dyestuff need not in fact have a similar structure to that of the pigment it is being used to modify.

The soluble dyestuff may be prepared by coupling a suitably water solubilised tetrazotised benzidine with a coupling agent not containing water-solubilising groups, or by coupling a tetrazotised benzidine with a coupling agent containing water-solubilising groups, or by coupling a tetrazotised benzidine and a coupling agent both of which contain water-solubilising groups. By water-solubilising groups we mean groups such as sulphonic acid and carboxylic acid groups and water-soluble metal salts thereof, amino groups and water-soluble salts of amino groups, for example those formed with aliphatic acids. The free acids of the dyestuffs may be obtained, for example, by boiling solutions of the sodium salts of the dyestuffs obtained in the coupling reactions in hydrochloric acid. Thus, for example, the pigment might be acetoacet-o-toluidide coupled to tetrazo-3:3'-dichloro-benzidine, and the soluble dyestuff could be acetoacetanilide coupled to tetrazo 4:4'-diamino 2:2'-biphenyl disulphonic acid; alternatively the pigment might be acetoacet-m-xylidide coupled to tetrazo-3:3'-dichlorobenzidine and the soluble dyestuff could be acetoacet-m-xylidide coupled to tetrazo-4:4'-diamino-2:2'-biphenyl disulphonic acid. Mixtures of soluble dyestuffs may be used.

The sulphonated or carboxylated benzidines used in the invention may be mono- or di-substituted, or may have more than two acid group substituents. Very suitable benzidines are disubstituted, that is they have one substituent sulphonic acid group or carboxylic acid group on each aromatic nucleus.

The exact mechanism by which the improvement in the benzidine pigment is obtained is not yet fully understood. It is however believed that some active species, most probably the soluble dyestuff itself, is adsorbed onto the surface of the pigment particles, possibly affecting the growth of the particles and their crystalline nature, and modifying their final surface properties. If desired, the adsorbed soluble dyestuff may be rendered insoluble at a later stage in the preparation of the pigment, for example by the formation of insoluble salts of metals of Groups IA, IB, IIA, IIB, IIIA, IIIB and VIII of the Periodic Table. One very suitable way of forming the insoluble salts is by a double decomposition reaction between the sodium salt of the dyestuff and a water-soluble salt of the selected metal at an alkaline pH such as 8 – 9; typical soluble metal salts are zinc sulphate, magnesium sulphate, barium chloride, aluminum sulphate and calcium chloride. It may be desirable for the soluble dyestuff component in the pigment to be insolubilised in this way if there is a danger of the dyestuff being washed off during the washing stage of the preparation of the treated pigment or of the dyestuff bleeding into the fountain solution used in letterpress- /lithographic printing processes. Furthermore, a hydrophilic surface on a pigment may cause bleeding into a fountain solution. The retention of the dye in the final pigment composition as a water-insoluble metal salt also gives the pigment further advantages.

The invention also includes the diarylide pigment compositions prepared in this way, and mixtures of two or more of such compositions. The compositions may be made from a single pigment benzidine and different coupling agents together with the dyestuff, or from different pigment benzidines and a single coupling agent together with the dyestuff. In general the compositions will contain up to 25 percent by weight of soluble dyestuff calculated on the pigment; we prefer to incorporate from 1 to 10 percent by weight.

When the soluble dyestuff is prepared in situ, a stoichiometric excess of one or other of the pigment coupling agent over the tetrazotised pigment benzidine is used. We have found a suitable excess is such that there is in fact the theoretical amount of the components required for complete stoichiometric coupling to give both the pigment and soluble dyestuff or even a slight excess of the coupling agent over this stoichiometric amount say up to 5 percent by weight calculated on the other components to be coupled.

The sulphonated or carboxylated benzidines which may be used in the process according to the invention include the acids themselves, and their soluble metallic salts. The proportion of sulphonated or carboxylated benzidine may be up to 25 percent by weight of the pigment benzidine but we prefer to use not more than 10 percent. No further significant improvement is noted if larger proportions are used.

The additional incorporation into pigment compositions according to the invention of a resin or resinous material is found to enhance the flow properties of the compositions in letterpress varnishes. Examples of such resins or resinous materials are wood rosin and its derivatives such as hydrogenated wood rosin, and polyamide type resins such as are formed by condensation of phthalic anhydride and long chain amines. Furthermore the incorporation of surface-active agents, for example the naphthalene disulphonic acid/formaldehyde condensate sold under the trade mark Belloid SFD, is found to improve the tinctorial strength of the compositions in letterpress varnish, and the incorporation of nonionic surfactants such as long chain alcohols/ethylene oxide condensates and especially that one sold under the trade mark Lubrol W, a cetyl alcohol ethylene oxide condensate, will improve gloss and texture in printing inks.

The invention will be exemplified with five classes of diarylide pigments, as follows:

1. Benzidine Yellows

| Name or Colour Index Number | Formed by coupling |
|---|---|
| Pigment Yellow 12 | 3:3'-dichlorobenzidine and acetoacetanilide |
| (Colour Index No.21090) | |
| Pigment Yellow 13 | 3:3'-dichlorobenzidine and acetoacet-2,4-xylidide |
| (Colour Index No.21100) | |
| Pigment Yellow 14 | 3:3'-dichlorobenzidine and acetoacet-o-toluidide |
| (Colour Index No.21095) | |
| Pigment Yellow 17 | 3:3'-dichlorobenzidine and acetoacet-o-anisidide |
| (Colour Index No.21105) | |
| Pigment Yellow 81 | 2:2':5:5'-tetrachlorobenzidine and acetoacet-2,4-xylidide 3:3'-dichlorobenzidine and acetoacet-p-toluidide |
| | 3:3'-dichlorobenzidine and acetoacet-o-chloranilidide |

2. Benzidine Oranges

| Name or Colour Index Number | Formed by coupling |
|---|---|
| Pigment Orange 15 | 3:3'-dichlorobenzidine and 1-phenyl-3-methyl-5-pyrazolone |
| (Colour Index No. 21130 | |
| Pigment Orange 34 | 3:3'-dichlorobenzidine and 1-p-tolyl-3-methyl-5-pyrazolone |
| (Colour Index No.21115) | |

3. Benzidine Reds

| Name or Colour Index Number | Formed by coupling |
|---|---|
| Pigment Red 37 | 3:3'-dimethoxybenzidine and 1-p-tolyl-3-methyl-5-pyrazolone |
| Colour Index No.21205) | |
| Pigment Red 41 | 3:3'-dimethoxybenzidine and 1-phenyl-3-methyl-5-pyrazolone |
| (Colour Index No.21200) | |

4. Benzidine Blues

| Name or Colour Index Number | Formed by coupling |
|---|---|
| Pigment Blue 20 | 3:3'-dimethoxy benzidine and anilide of 2-naphthol-3-carboxylic acid |
| (Dianisidine Blue) | |

5. Tolidine Yellows

| Name or Colour Index Number | Formed by coupling |
|---|---|
| Pigment Yellow | 3:3'-dimethylbenzidine and acetoacet-o-toluidide |
| (Colour Index No.21135) | |

Except where full details are given, the procedure used in the examples is essentially as follows :

A tetrazo solution is made in the usual way and kept at 0°C, and a coupling agent is dissolved in caustic soda solution.

The tetrazotised benzidine is coupled to the coupling agent by one of two procedures, usually at room temperature :

a. by reprecipitating the coupling agent with dilute acid in a coupling vessel and running in the tetrazo solution over 1 hour, again usually at room temperature. The pH of the coupling is normally 4 to 4.5 or b. the tetrazo solution and coupling agent solution are run in together into a coupling vessel containing sodium acetate buffer. The pH again is controlled as in a.

After coupling the slurry is raised to the boil and held at the boil for 1 hour. The slurry is then filtered, the pigment composition washed free of inorganic salts and dried at 50–55°C.

The dyestuff can be added or made in situ at one of the four stages :

1. Before the coupling stage
2. During the coupling stage
3. After the coupling stage
4. After the boiling stage The addition of any metal salts is usually either at stages 3 or 4 to make the dyestuffs water-insoluble.

Example 1

Solution 1: Tetrazo 3:3'-dichlorobenzidine was prepared by tetrazotising 26 parts of 3:3'-dichlorobenzidine in 500 parts of water at 0°C.

Suspension 2: Tetrazo 4:4'-diamino-2:2'-biphenyl disulphonic acid was prepared by tetrazotising 2.0 parts of 4,4'-diamino-2, 2'-biphenyl disulphonic acid in 50 parts of water at 0°C.

Solution 3: 40.5 parts of acetoacetanilide were dissolved in 9.9 parts of sodium hydroxide in 900 parts of water.

A solution of 20 parts of sodium acetate in 200 parts of water was prepared in a coupling vessel. The pH was then adjusted to 4.5 with dilute acetic acid.

5 percent of solution 3 was added to the coupling vessel and then suspension 2 run in over the course of 10 minutes, ensuring that at no time was any substantial quantity of uncoupled tetrazo compound present. Solutions 1 and 3 were then run into the vessel simultaneously at ambient temperature, over the course of 1 hour, again no excess of tetrazo being allowed at any time, and the pH was controlled at 4.5 as necessary by addition of 10 percent sodium hydroxide solution. The reaction mixture was then raised to the boil, and boiled for 30 minutes, the pigment composition was filtered off, washed with water and dried at 50 – 55°C.

The pigment composition thus prepared when incorporated into a letterpress varnish had better colouring strength and greater transparency of print than had a pigment prepared simply by coupling 3:3'-dichlorobenzidine and acetoacetanilide.

Example 2

The same solutions and reaction conditions were used as in Example 1, but the procedure was somewhat altered in that solution 1 and suspension 2 were first mixed together, and then coupled with solution 3. The pigment obtained was similar to that obtained in Example 1.

Example 3

The same solutions and reaction conditions were used as in Example 1, but the procedure was somewhat altered in that solution 1 was first coupled with solution 3 and then suspension 2 was added to the reaction mixture. The pigment obtained was similar to that obtained in Example 1.

Example 4

Solution 1. Tetrazo 3:3'-dichlorobenzidine was prepared by tetrazotising 26 parts of 3:3'-dichlorobenzidine in 500 parts of water at 0°C.

Suspension 2. Tetrazo 4:4'-diamino-2:2'-biphenyl disulphonic acid was prepared by tetrazotising 2.0 parts of 4,4'-diamino-2,2'-biphenyl disulphonic acid in 50 parts of water at 0°C.

Solution 3. 40.5 parts of acetoacetanilide was dissolved in 9.9 parts of sodium hydroxide in 900 parts of water.

A solution of 20 parts of sodium acetate in 200 parts of water was prepared in a coupling vessel. The pH was then adjusted to 4.5 with dilute acetic acid.

5 percent of solution 3 was added to the coupling vessel and then suspension 2 run in over the course of 10 minutes, ensuring that at no time was any substantial quantity of uncoupled tetrazo compound present. Solutions 1 and 3 were then run into the vessel simultaneously at ambient temperature, over the course of 1 hour, again no excess of tetrazo being allowed at any time, and the pH was controlled at 4.5 as necessary by addition of 10 percent sodium hydroxide solution. 2.4 parts of the resin based on abietic acid sold under the Trade Mark WW Rosin dissolved in 6.0 parts of 10 percent sodium hydroxide were added to the pigment slurry. The slurry was then boiled for 1 hour, the pH adjusted to 6–6.5 using 10 percent sodium hydroxide solution and 1.7 parts of zinc sulphate was added; the slurry was filtered and the pigment composition thus obtained washed with water, and dried at 50–55°C.

The pigment composition was similar to that obtained in Example 1, with the same advantages and better flow properties when incorporated into a letterpress varnish.

Example 5

The procedure in Example 4 was repeated except that the WW Rosin was replaced by the hydrogenated abietic acid sold under the trade mark Staybelite Resin. A pigment composition having similarly excellent properties was obtained.

Example 6

The procedure of Example 4 was repeated twice except that in one case the WW Rosin was replaced by a resin prepared by the reaction of phthalic anhydride and dedecylamine, and in the other case by Beckacite 1624 (a rosin-modified cresylic acid). In each case, a pigment composition having similar excellent properties was obtained to that resulting from Example 4.

A range of dyestuffs having the following general formula I and the respective substituents listed in the following Table 1 was incorporated into Pigment Yellow 12, Colour Index No. 21090, at each of the four possible stages of preparation outlined just before Example 1 above, added to the reaction mixture as an aqueous solution/slurry or prepared in situ.

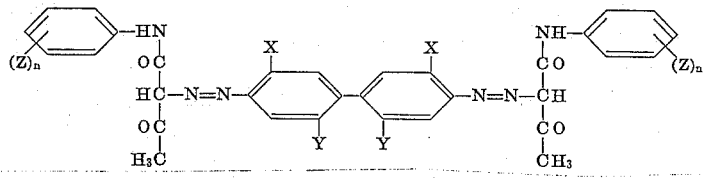

I

TABLE 1

| Example No. | X | Y | Z | n |
|---|---|---|---|---|
| 7 | Cl | H | 4—SO$_3$Na | 1 |
| 8 | H | H | 4—SO$_3$Na | 1 |
| 9 | CH$_3$ | SO$_3$Na | H | 1 |
| 10 | CH$_3$ | SO$_3$Na | 4—SO$_3$Na | 1 |
| 11 | H | CO$_2$Na | H | 1 |
| 12 | Cl | H | 4—CO$_2$Na | 1 |
| 13 | H | SO$_3$(Ca) | H | 1 |
| 14 | H | SO$_3$(Ba) | H | 1 |
| 15 | Cl | H | p.NH$_2$ | 1 |

Applicational advantages as previously described for the product prepared in Example 1 are found in each case.

Example 16

Solution 1. Tetrazo 3:3'-dichlorobenzidine was prepared by tetrazotising 26 parts of 3:3'-dichlorobenzidine in 500 parts of water at 0°C.

Suspension 2. Tetrazo 4:4'-diamino-2:2'-biphenyl disulphonic acid was prepared by tetrazotising 2.0 parts of 4,4'-diamino-2, 2'-biphenyl disulphonic acid in 50 parts of water at 0°C.

Solution 3. 46.9 parts of acetoacet-m-xylidide were dissolved in 9.9 parts of sodium hydroxide in 900 parts of water.

A solution of 20 parts of sodium acetate in 200 parts of water was prepared in a coupling vessel. The pH was then adjusted to 4.5 with dilute acetic acid.

5 percent of solution 3 was added to the coupling vessel and then suspension 2 run in over the course of 10 minutes, ensuring that at no time was any substantial quantity of uncoupled tetrazo compound present. Solutions 1 and 3 were then run into the vessel simultaneously at ambient temperature, over the course of 1 hour, again no excess of tetrazo being allowed at any time, and the pH was controlled at 4.5 as necessary by addition of 10 percent sodium hydroxide solution. The reaction mixture was then raised to the boil, and boiled for 30 minutes, the pigment composition was filtered off, washed with water and dried at 50 – 55°C.

The pigment composition thus prepared when incorporated into a letterpress varnish had better colouring strength and greater transparency of print than had a pigment prepared simply by coupling 3:3'-dichlorobenzidine and acetoacet-m-xylidide.

Example 17

The same solutions and reaction conditions were used as in Example 16, but the procedure was somewhat altered in that solution 1 and suspension 2 were first mixed together, and then coupled with solution 3. The pigment obtained was similar to that obtained in Example 16.

Example 18

The same solutions and reaction conditions were used as in Example 16, but the procedure was somewhat altered in that solution 1 was first coupled with solution 3 and then suspension 2 was added to the reaction mixture. The pigment obtained was similar to that obtained in Example 16.

Example 19

1. A tetrazo solution was made from 28.0 parts 3:3'-dichloro-benzidine in 500 parts water
2. 46.85 parts of acetoacet-m-xylidide were dissolved in 900 parts water containing 9.15 parts of sodium hydroxide.

A solution of 20 parts of sodium acetate in 200 parts of water was prepared in a coupling vessel. The pH was then adjusted to 4.5 with dilute acetic acid. 5 parts of the sodium salt of the dyestuff prepared from coupling tetrazo 4:4'-diamino-2:2'-biphenyl disulphonic acid and acetoacet-m-xylidide, dssolved in dilute sodium hydroxide solution, was added to the coupling vessel.

Solutions 1 and 2 were run into the vessel simultaneously at ambient temperature, over the course of 1 hour, no excess of tetrazo being allowed at any time, and the pH was controlled at 4.5 as necessary by addition of 10 percent sodium hydroxide solution. The reaction mixture was then raised to the boil, and boiled for 30 minutes, the pigment composition was filtered off, washed with water and dried at 50 – 55°C.

The pigment composition thus prepared had the same advantages over untreated pigment as are shown by the pigment composition of Example 16.

Example 20

The procedure of Example 16 was repeated, up to the point where all the solutions had been coupled together. The pH was raised to 8 – 8.5 with dilute caustic soda solution, and 2 parts of barium chloride in 50 parts of water added. The reaction mixture was then boiled and filtered, and the pigment separated off was washed and dried as in Example 16.

The pigment obtained was similar to that resulting from the process of Example 16.

Example 21

The procedure of Example 16 was again repeated, up to the point where all the solutions had been coupled together. The pH was then lowered to 1 – 2 with dilute hydrochloric acid, and the reaction mixture boiled and filtered; the pigment separated off was washed and dried as in Example 16.

The pigment obtained was similar to that obtained from the process of Example 16.

Examples 22, 23, 24

The same solutions and reaction conditions were used as in Examples 16, 17 and 18 respectively except that 5:5'-dimethyl-4:4'-diamino-2:2'-biphenyl disulphonic acid (2 parts) replaced the 4:4'-diamino-2:2'-biphenyl disulphonic acid. The pigment compositions formed had advantages over untreated pigments, as in Example 16.

Examples 25, 26, 27

The same solutions and reaction conditions were used as in Examples 16, 17, and 18 respectively except that 4:4'-diamino-3, 3'-biphenyl dicarboxylic acid (1.9 parts) replaced 4:4'-diamino-2:2'-biphenyl disulphonic acid. The pigment compositions formed had advantages over untreated pigments, as in Example 16.

Example 28

The same solutions and reaction conditions were used as in Example 19 except that the dyestuff prepared by coupling tetrazo 4:4'-diamino-2:2'-biphenyl disulphonic acid and acetoacetanilide replaced the dyestuff prepared by coupling tetrazo 4:4'diamino-2:2'-biphenyl disulphonic acid and acetoacet-m-xylidide. The pigment obtained was similar to that obtained in Example 16.

Example 29

The same solutions and reaction conditions were used as in Example 19 except that the dyestuff sold under the trade mark Diphenyl Chrysoin 3 G, C.I. Direct Yellow 12, replaced the dyestuff prepared from coupling tetrazo 4:4'-diamino-2:2'-biphenyl disulphonic acid and acetoacet-m-xylidide. The pigment obtained was similar to that obtained in Example 16, with similar advantages.

Example 30

The same solutions and reaction conditions were used as in Example 19 except that the dyestuff prepared from coupling tetrazo 3:3'-dichlorobenzidine and acetoacetanilide-4-sulphonic acid (sodium salt) replaced the dye used in Example 19. The pigment obtained had excellent properties.

Example 31

The same solutions and reaction conditions were used as in Example 19 except that the dyestuff prepared from coupling tetrazo 3:3'-dichlorobenzidine and acetoacetanilide-4-carboxylic acid replaced the dye used in EXample 19. The pigment obtained had excellent properties.

Example 32

The same solutions and reaction conditions were used as in Example 19 except that the dyestuff prepared from coupling tetrazo 3:3'-dichlorobenzidine and acetoacet-4-aminoanilide, as the acetate salt replaced the dye used in Example 19. A product similar to that resulting from Example 16 was obtained.

Example 33

The procedure described in Example 16 was repeated, using however the calcium salt of the dyestuff instead of the sodium salt. The pigment composition obtained had similar excellent properties to the pigment composition obtained in Example 16.

Example 34

The same solutions and reaction conditions were used as in Example 19 except that the dyestuff prepared by coupling tetrazotised 4,4'-diamino-2,2'-biphenyl disulphonic acid to acetoacetanilide-4-sulphonic acid sodium salt replaced the dyestuff prepared from coupling tetrazo 4,4'-diamino diphenyl-2,2'-disulphonic acid and acetoacet-m-xylidide.

Examples 35, 36 and 37

The same solutions and reaction conditions were used as in Examples 16, 17 and 18 respectively except that acetoacetortho toluidide (43.7 parts) replaced the acetoacetmetaxylidide.

Enhanced colouring strength and transparency of print were found for these products over an untreated preparation of the same pigment.

Example 38

Solution 1. Tetrazo 3:3'-dichlorobenzidine was prepared by tetrazotising 26 parts of 3:3'-dichlorobenzidine in 500 parts of water at 0°C.

Suspension 2. Tetrazo 4:4'-diamino-2:2'-biphenyl disulphonic acid was prepared by tetrazotising 2.0 parts of 4,4'-diamino-2:2'-biphenyl disulphonic acid in 50 parts of water at 0°C.

Solution 3. 2.5 parts of acetoacetanilide was dissolved in 0.6 parts of sodium hydroxide in 50 parts of water. This was added to a solution of 20 parts of sodium acetate in 200 parts of water in the coupling vessel. The pH was then adjusted to 6.5 with dilute acetic acid.

Suspension 2. was added to the coupling vessel over 10 minutes, ensuring that at no time was any substantial quantity of uncoupled tetrazo compound present.

Solution 4. 41.5 aprts of acetoacetorthotoluidide was dissolved in 915 parts of sodium hydroxide in 900 parts of water. 5 percent of this solution was run into the coupling vessel. Solutions 1 and 4 were then run into the coupling vessel, over the course of 1 hour, again no excess of tetrazo being allowed at any time, and the pH was controlled at 4.5 as necessary by addition of 10 percent sodium hydroxide solution.

The reaction mixture was then raised to the boil, the pigment composition filtered off, washed with water and dreid at 50–55°C.

Transparency, tinctorial strength and gloss improvements in letterpress varnishes over a non-treated pigment were found.

Example 39

The procedure described in Example 38 was followed except that the dyestuff prepared by coupling acetoacetanilide with aniline 2.5 disulphonic acid was used. The pigment composition obtained had similar advantages over non-treated pigment to the pigment composition of Example 38

Examples 40 to 48

A range of dyestuffs having the general formula I and the specific substituents listed in the following Table 2 was incorporated into Pigment Yellow 14, Colour Index No. 21095, at each of the four possible stages of preparation outlined just before Example 1, added to the reaction mixture as an aqueous slurry/solution or prepared in situ.

TABLE 2

| Example No. | X | Y | Z | n |
|---|---|---|---|---|
| 40 | Cl | H | 4—$SO_3Na$ | 1 |
| 41 | H | $SO_3Na$ | 4—$SO_3Na$ | 1 |
| 42 | $CH_3$ | $SO_3Na$ | H | 1 |
| 43 | $CH_3$ | $SO_3Na$ | 2— $CH_3$ | 1 |

Applicational advantages as previous described are found in each case.

The general procedures described were repeated with the benzidine yellow pigments and the dyestuffs set out in the following Table 3. The dyestuffs again had the formula I previously defined.

TABLE 3

| Example No. | Pigment | X | Y | Z | n |
|---|---|---|---|---|---|
| 44 | Pigment Yellow 47 | H | $SO_3Na$ | 2—$OCH_3$ | 1 |
| 45 | Pigment Yellow 81 | Cl | Cl | 4—$SO_3Na$ | 1 |
| 46 | Dichlorobenzidine coupled with acetoacet-p-toluidide | H | $SO_3Na$ | p.$CH_3$ | 1 |
| 47 | Dichlorobenzidine coupled with acetoacet-o-chloranilide | H | $SO_3Na$ | o-Cl | 1 |
| 48 | | $CH_3$ | $SO_3Na$ | o-Cl | 1 |

Applicational advantages as previously described are found in each case.

Example 49

A tetrazo solution was prepared from 50.6 parts 100 percent 3:3'dichlorobenzidine as the hydrochloride in 1,500 parts of water at 0°C.

A suspension of 72 parts of 1-phenyl-3-methyl-5-pyrazolone in 1,500 parts water was buffered with 50 parts of sodium acetate.

The tetrazo solution was run into the pyrazolone suspension over one hour. The pH of the solution was controlled at 4.0–4.5. After coupling the slurry was split into 5 parts.

Part A   The slurry was filtered, the pigment obtained washed with water and dried at 50°C.

Part B   The slurry was boiled for 1 hour, filtered, the pigment obtained washed with water and dried at 50°C.

Part C   To the slurry was added 5 percent by pigment weight of a dyestuff prepared from coupling tetrazo benzidine 2:2'-disulphonic acid and p-sulphonated phenyl methyl pyrazolone. The resulting slurry was boiled for one hour, filtered and the pigment composition washed with water and dried at 50–55°C.

Part D   The slurry was heated to 90°C, and held at 90°C for 10 minutes, 5 percent of the same dyestuff added as was added to part C and the slurry boiled for 30 minutes. The slurry was then filtered, the pigment composition washed with water, and dried at 50–55°C.

Part E   The slurry was boiled for 30 minutes, 5 percent of the same dyestuff added, the slurry was filtered, and the pigment composition washed free of salt and dried at 50–55°C.

In letterpress varnishes the pigment composition resulting from A was identical to that resulting from C in hue, transparency and gloss, B was identical to E, both B and E being lower in transparency and gloss than A and C, and D had properties in between A and B. This illustrates the stabilisation of the pigment by the dyestuff at the stage the dyestuff is added.

Examples 50 to 54

A range of dyestuffs of the following general formulae II and III and having the actual substituents specified in the following Table 4 was incorporated into Pigment Orange 15, Colour Index No. 21130, at each of the four possible stages of preparation outlined just before Example 1, added to the reaction mixture as an aqueous solution/slurry or prepared in situ.

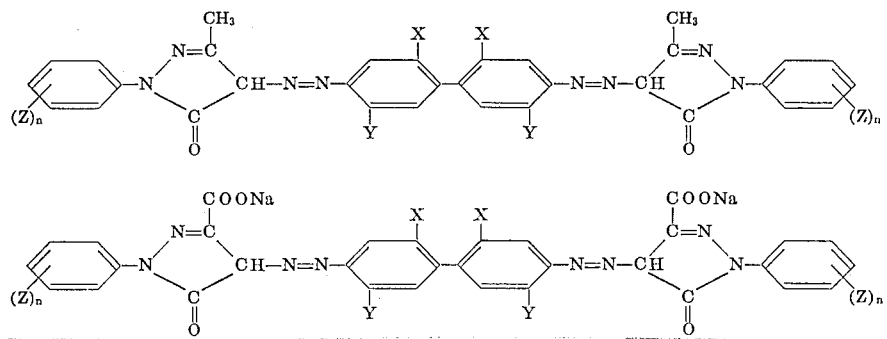

TABLE 4

| Example | Dyestuff Formula | X | Y | Z | n |
|---|---|---|---|---|---|
| 50 | | H | SO₃Na | H | 1 |
| 51 | II | Cl | H | 4-SO₃Na | 1 |
| 52 | | H | SO₃Ca | H | 1 |
| 53 | | H | H | H | 1 |
| 54 | III | H | H | 3-NH₂ | 1 |

Applicational advantages as previously described are found in each case.

Example 55

Solution 1. Tetrazo 3,3-dichlorobenzidine was prepared by tetrazotising 77.1 parts of 3,3'-dichlorobenzidine in 1,500 parts of water at 0°C.

Suspension 2. Tetrazo 4,4'-diamino 2,2'-biphenyl disulphonic acid was prepared by tetrazotising 5.35 parts 4,4'diamino-2,2'-biphenyl disulphonic acid in 100 parts water at 0°C.

Solution 1 and Suspension 2 were mixed to give suspension 4.

Solution 3. 126 parts of 1-p-tolyl-3-methyl-5-pyrazolone were dissolved in 37.8 parts sodium hydroxide in 900 parts of water.

A solution of 7.2 parts sodium acetate in 2,000 parts water was then prepared in a coupling vessel. The pH was adjusted to 5.0 with dilute hydrochloric acid and solution 3 and suspension 4 run in simultaneously at ambient temperature over the course of 30 minutes ensuring that at no time was any substantial quantity of uncoupled tetrazo present.

The resultant slurry was then heated to 90°C and held for 30 minutes. The pigment composition was filtered off, washed with water and dried at 50–55°C.

The pigment composition thus prepared had a superior colouring strength, gloss and transparency when incorporated into letterpress varnish to the pigment prepared simply by coupling 3,3'-dichlorobenzidine and 1-p-tolyl-3-methyl-5-pyrazolone.

Example 56

Solution 1. Tetrazo 3,3'-dichlorobenzidine was prepared by tetrazotising 50.6 parts of 3,3'-dichlorobenzidine in 1,000 parts of water at 0°C.

Solution 2. 77.0 parts of 1-p-tolyl-3-methyl-5-pyrazolone were dissolved in 23.0 parts sodium hydroxide in 500 parts of water.

A solution of 5.5 parts of sodium acetate in 1,500 parts of water was then prepared in a coupling vessel I. Solutions 1 and 2 were run in simultaneously at ambient temperature over the course of 30 minutes ensuring that no time was any substantial quantity of uncoupled tetrazo present. This gave slurry I.

Solution 3. Tetrazo 3,3'-dichlorobenzidine was prepared by tetrazotising 2.1 parts of 3,3'-dichlorobenzidine in 50 parts of water at 0°C.

Solution 4. 4.4 parts of 1-p-sulphophenyl-3-methyl-5-pyrazolone were dissolved in 1.5 parts of sodium hydroxide in 50 parts of water.

A solution of 2.0 parts of sodium acetate in 200 parts of water was then prepared in a coupling vessel II. Solutions 3 and 4 were run in simultaneously at ambient temperature over the course of 10 minutes ensuring that at no time was any substantial quantity of uncoupled tetrazo present. This gave slurry II.

Slurry II was then added to slurry I and the mixture was heated to 90°C, filtered, washed with water and dried at 50°C.

The advantages of this pigment composition over non-treated pigment prepared simply by coupling 3:3'-dichlorobenzidine and 1-p-tolyl-3-methyl-5-pyrazolone are similar to those of the pigment composition prepared in example.

Example 57

Solution 1. Tetrazo 3,3'-dichlorobenzidine was prepared by tetrazotising 77.1 parts of 3,3'-dichlorobenzidine in 1,500 parts of water at 0°C Suspension 2. Tetrazo 4,4'-diamino 2,2'-biphenyl disulphonic acid was prepared by tetrazotising 5.35 parts, 4,4'-diamino-2,2'- biphenyl disulphonic acid in water at 0°C.

Solution 3. 126 parts 1-p-tolyl-3-methyl-5-pyrazolone were dissolved in 37.8 parts sodium hydroxide in 900 parts of water.

A solution of 7.2 parts sodium acetate in 2,000 parts water was then prepared in a coupling vessel. The pH was adjusted to 5.0 with dilute hydrochloric acid and solutions 1 and 3 run in simultaneously at ambient temperature over the course of 30 minutes ensuring that at no time was any substantial quantity of uncoupled tetrazo present. Suspension 2 was then added over 10 minutes to the reaction mixture from solutions 1 and 3 and the resultant reaction mixture heated to 90°C. for 30 minutes. The pigment was filtered off, washed with water and dried at 50–55°C.

The pigment thus prepared had a superior colouring strength when incorporated into letterpress varnish to the pigment prepared simply by coupling 3,3'-dichlorobenzidine and 1-p-tolyl-3-methyl-5-pyrazolone.

Example 58

Suspension 1. Tetrazo 4,4'-diamino-2,2'-biphenyl disulphonic acid was prepared by tetrazotising 2.6 parts of 4,4'-diamino-2,2'- biphenyl disulphonic acid at 0°C.

Solution 2. 3.9 parts of 1-p-sulphophenyl-3-methyl-5-pyrazolone were dissolved in 1.4 parts of sodium hydroxide in 50 parts of water.

Solution 3. Tetrazo 3,3'-dichlorobenzidine was prepared by tetrazotising 50.6 parts of 3,3'-dichlorobenzidine in 1,000 parts of water at 0°C.

Solution 4. 77.0 parts of 1-p-tolyl-3-methyl-5-pyrazolone were dissolved in 23.0 parts sodium hydroxide in 500 parts of water, A solution of 5.5 parts of sodium acetate in 1,500 parts of water was then prepared in a coupling vessel.

Suspension 1 and Solution 2 were then run in simultaneously at ambient temperature over the course of 10 minutes ensuring that at no time was any substantial quantity of uncoupled tetrazo present.

After this, solutions 3 and 4 were then run in simultaneously at ambient temperature over the course of 30 minutes ensuring that at no time was any substantial quantity of uncoupled tetrazo present.

The resultant slurry was then heated to 90°C held at 90°C for 30 minutes, filtered and the pigment composition washed with water and finally dried at 50°C.

Advantages of this pigment composition are similar to those of the composition of Example 55.

Example 59.

Solution 1. Tetrazo 3,3'-dichlorobenzidine was prepared by tetrazotising 77.1 parts of 3,3'-dichlorobenzidine in 1,500 parts of water at 0°C.

Suspension 2. Tetrazo 4,4'-diamino 2,2'-biphenyl disulphonic acid was prepared by tetrazotising 5.35 parts 4,4'-diamino-2,2'-biphenyl disulphonic acid in water at 0°C.

Solution 3. 6.2 parts of acetoacetanilide was dissolved in 2 parts of sodium hydroxide in 50 parts of water. This was added to a solution of 7.2 parts sodium acetate in 2000 parts water in a coupling vessel. Suspension 2 was run into the coupling vessel over 10 minutes, ensuring that no excess of tetrazo was present.

Solution 4. 120 parts of 1-p-toly-3-methyl-5-pyrazolone were dissolved in 36.0 parts sodium hydroxide in 900 parts of water. 5 percent of this solution was added to the coupling vessel.

Solutions 1 and 4 were run in simultaneously into a coupling vessel over the course of 30 minutes ensuring no excess of tetrazo was present. The pH of coupling was maintained at 4.5 by adding the required amount of 10 percent sodium hydroxide during the coupling process.

The slurry was heated to 90°C, filtered and the pigment composition washed with water and dried at 50–55°C.

The pigment composition thus prepared had a superior colouring strength when incorporated into letterpress varnish to the pigment prepared simply by coupling 3,3'-dichlorobenzidine and 1-p-tolyl-3-methyl-5-pyrazolone.

Example 60

The conditions for this preparation are identical to those of Example 58 except that 5 percent of the formaldehyde condensate with naphthalene disulphonic acid sold under the Trade Mark Belloid SFD is added before the coupling stages to the coupling vessel.

The pigment composition is found to have greater tinctorial strength than that of Example 58 when incorporated in letterpress varnish.

Examples 61 to 64

Further dyestuffs were incorporated in Pigment Orange 34 as in the following Table 5, at each of the possible stages of preparation outlined above, added to the reaction mixture as an aqueous solution/slurry or prepared in situ. The dyestuffs had the formula II as previously defined.

TABLE 5

| Example | X | Y | Z | n |
|---|---|---|---|---|
| 61 | H | SO$_3$Na | H | 1 |
| 62 | H | SO$_3$Ba | H | 1 |
| 63 | H | SO$_3$Na | 4- SO$_3$Na | 2 |
| 64 | Cl | H | 4- SO$_3$Na | 2 |

Applicational advantages as previously described are found in each case.

Examples 65 and 66

Two benzidine reds were treated with dyestuff of formula II above, as in the following Table 6.

TABLE 6

| Example | Pigment | X | Y | Z | n |
|---|---|---|---|---|---|
| 65 | Pigment Red 37 | H | SO$_3$Na | 4-SO$_3$Na | 1 |
| 66 | Pigment Red 41 | H | SO$_3$Na | 4-SO$_3$Na | 1 |

Pigment composition prepared according to these two examples show excellent transparency in letterpress varnish.

Example 67

The yellow pigment, Colour Index No. 21135 was treated at each of the four stages of preparation listed above with the dyestuff having the formula

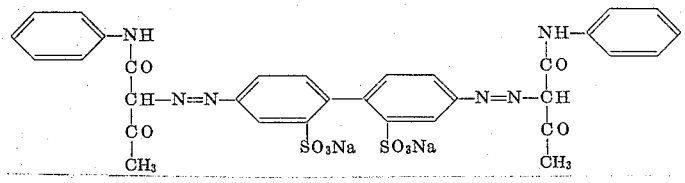

Example 68

Solution 1: Tetrazo-3,3'-dimethoxy benzidine was prepared by diazotising 30.5 parts of 100 percent 3,3'-dimethoxy benzidine with hydrochloric acid and 18.2 parts of sodium nitrite giving a final volume of 550 parts at a temperature of 0°C.

Solution 2: A solution of 36 parts of sodium hydroxide and 8 parts of Turkey Red Oil in 800 parts of water was heated to 70°C. 69.7 parts of Naphthol AS (2-hydroxynaphthalene-3-carboxanilide) were added slowly with stirring giving a final volume of 1,200 parts and a temperature of 25°C.

Solution 3: 5 parts of the dyestuff having the formula:

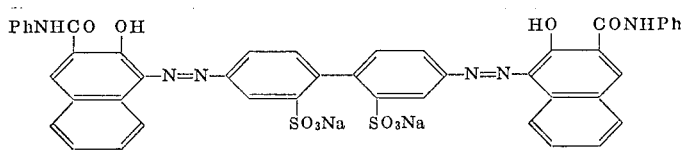

prepared by coupling tetrazo benzidine-2,2'-disulphonic acid with Naphthol AS were dissolved in a 10 percent solution of sodium hydroxide.

Solution 1 was run into solution 2, the pH being maintained above 10.5 by suitable addition of 10 percent sodium hydroxide solution. When the coupling was complete, the pH of the suspension was lowered to 5.0 and solution 3 was added. The slurry was then boiled for 1 hour and the product filtered off, washed and dried at 50 – 55°C.

The pigment composition had superior gloss and tinctorial strength in letterpress varnish to the product of a similar process in which the dyestuff was omitted.

Example 69

The procedure described in Example 16 was repeated except that 25 percent by weight (calculated on the weight of the pigment) of the magnesium salt of wood rosin was added to the coupling vessel before the coupling was started.

The pigment composition was compared with the equivalent resinated pigment which had not been treated with the dyestuff. In letterpress inks the dyestuff treated pigment produced a more transparent, tinctorially stronger print than did the other.

Two examples will now be given of the dyestuff treatment of mixed couplings.

Example 70

Tetrazo 3.3'-dichlorobenzidine was made in the usual way from 54.8 parts of 100 percent 3.3'-dichlorobenzidine.

47.0 parts of acetoacet-meta-xylidide and 40.6 parts of acetoacetanilide were dissolved in 27 parts of sodium hydroxide in 1,300 parts of water.

In a coupling vessel were dissolved 50 parts of sodium acetate in 500 parts of water. 10 percent of the coupling component solution was added and the pH of the solution adjusted to below 7.0 with dilute hydrochloric acid.

Both coupling component and tetrazo solutions were then run in simultaneously at equal rates over 1 hour at room temperature.

After coupling the slurry was split into two equal parts:

A. This part was boiled for 1 hour, filtered and the pigment washed and dried at 50°C.
B. To the second part was added 5 percent by pigment weight of the dyestuff prepared from coupling tetrazo benzidine 2.2'-disulphonic acid with an equal molar mixture of acetoacetanilide and acetoacet-meta-xylidide. The dyestuff had previously been dissolved in hot water. The slurry was then boiled for 1 hour, filtered, and the pigment washed and dried at 50°C.

B showed strength and transparency advantages over the control A in letterpress ink media, B in addition showing gloss advantages.

Example 71

Tetrazo 3,3'-dichlorobenzidine was prepared by tetrazotising 25.3 parts of 3,3'-dichlorobenzidine.

This was coupled by a simultaneous process to a mixture of 17.4 parts of 1-phenyl-3-methyl-5-pyrazolone and 18.8 parts of 1-p-tolyl-3-methyl-5-pyrazolone at pH 4.5 - 5.0 at room temperature. A solution of 5 percent by pigment weight of a dyestuff prepared from coupling tetrazo benzidine 2.2' sulphonic acid with an equimolar mixture of 1-phenyl-3-methyl-5-pyrazolone and 1-p-tolyl-3-methyl-5-pyrazolone was added to the pigment slurry. The slurry was then heated to 90°C and held at that temperature for 30 minutes. It was then filtered, washed and dried at 50°C.

When the properties of this pigment composition are compared with a pigment composition which had not been treated with dyestuff during its preparation, it is found that in letterpress varnish transparency and gloss advantages are present.

What we claim is:

1. A diarylide pigment composition comprising (a) a coupled diarylide pigment and (b) a coupled water-soluble azo dyestuff.

2. A diarylide pigment composition according to claim 1 comprising (a) a coupled diarylide pigment and (b) a water-soluble metal salt of a sulphonated or carboxylated water-soluble azo dyestuff.

3. A diarylide pigment composition according to claim 1 comprising (a) a coupled diarylide pigment consisting of a pigment diarylide azo component coupled with an acetoacetarylide, pyrazolone or naphthol pigment coupling component and (b) a water-soluble azo dyestuff consisting of a dyestuff azo component coupled with a dyestuff coupling component.

4. A diarylide pigment composition according to claim 3 wherein the component (b) is a water-soluble azo dyestuff consisting of a diarylide dyestuff azo component coupled with an acetoacetanilide, pyrazolone or naphthol dyestuff coupling component.

5. A diarylide pigment composition according to claim 1 wherein the component (a) is a diarylide pigment having the formula

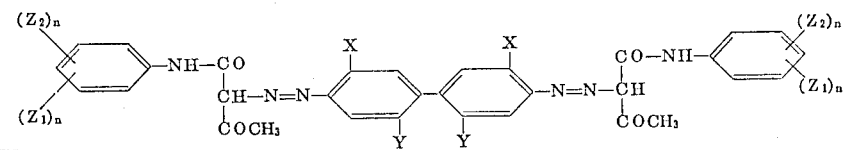

wherein X and Y are the same or different and each is H, $CH_3$, $OCH_3$ or Cl, and $Z_1$ and $Z_2$ are the same or different and each is H, $CH_3$, $OCH_3$ or Cl and $n$ is 1 or 2.

6. A diarylide pigment composition according to claim 1 wherein component $a$ is a diarylide pigment having the formula

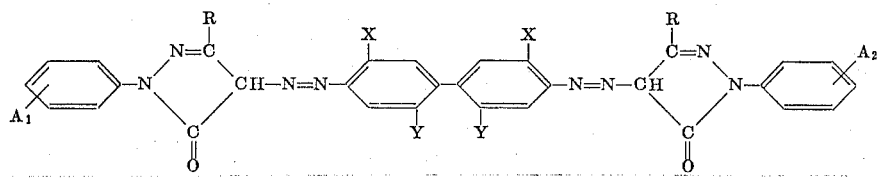

wherein X and Y are the same or different and each is H, CH$_3$, OCH$_3$ or Cl and A$_1$ and A$_2$ are the same or different and each is H, or alkyl, halogen and R is alkyl, carbalkoxy or carboxamide residues.

7. A diarylide pigment composition according to claim 1 wherein component *a* is a diarylide pigment having the formula

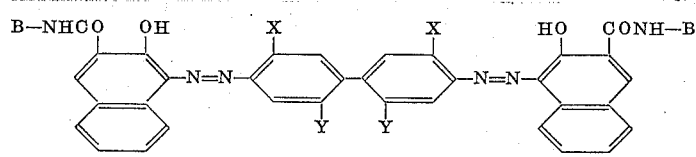

wherein X and Y are the same or different and each is H, CH$_3$, OCH$_3$ or Cl and B is the group

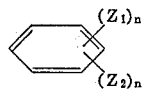

wherein Z$_1$ and Z$_2$ are the same or different and each is H, CH$_3$, OCH$_3$ and Cl or are each an α-naphthyl residue, and *n* is 1 or 2.

8. A diarylide pigment composition according to claim 1 wherein component *b* is a dyestuff having the formula

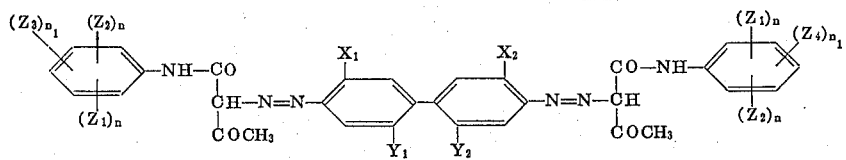

wherein X$_1$, X$_2$ and Y$_1$ and Y$_2$ are the same or different and each is H, CH$_3$, Cl, OCH$_3$ or an SO$_3$H or CO$_2$H group or their water-soluble metal salts or an amino group or water-soluble salts thereof, Z$_1$ and Z$_2$ are the same or different and each is H, CH$_3$, OCH$_3$ or Cl, Z$_3$ and Z$_4$ are the same or different and each is H or an SO$_3$H or CO$_2$H group or their water-soluble metal salts, or an amino group or water-soluble salts thereof, and $n_1$ is 1 or 2 and at least one and preferably not more than four of X$_1$, X$_2$, Y$_1$, Y$_2$, Z$_3$ or Z$_4$ is an SO$_3$H, CO$_2$H or amino group or a salt thereof.

9. A diarylide pigment composition according to claim 1 wherein component *b* is a dyestuff having the formula

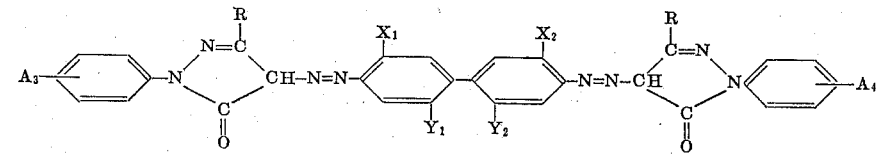

wherein X$_1$, X$_2$ and Y$_1$ and Y$_2$ are the same or different and each is H, CH$_3$, Cl, OCH$_3$ or an SO$_3$H or CO$_2$H group or their water-soluble metal salts or an amino group or water-soluble salts thereof, R is an alkyl, carbalkoxy, carboxamide or CO$_2$H residue or salts thereof, A$_3$ and A$_4$ are the same or different and each is H, Cl, CH$_3$, amino, SO$_3$H, CO$_2$H or a water-soluble salt thereof and at least one and preferably not more than four of X$_1$, X$_2$, Y$_1$, Y$_2$, A$_3$, A$_4$ and R is SO$_3$H, CO$_2$H, amino or salt thereof.

10. A diarylide pigment composition according to claim 1 wherein component *b* is a dyestuff having the formula

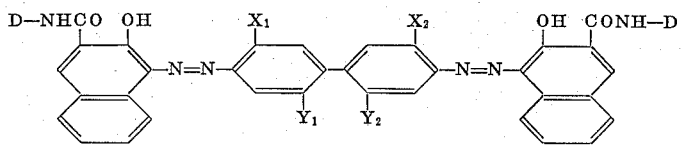

wherein X$_1$, X$_2$ and Y$_1$ and Y$_2$ are the same or different and each is H, CH$_3$, Cl, OCH$_3$ or an SO$_3$H or CO$_2$H group or their water-soluble metal salts or an amino group or water-soluble salts thereof, D has the formula

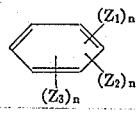

wherein Z$_1$ and Z$_2$ are the same or different and each is H, CH$_3$, OCH$_3$ or Cl and Z$_3$ is H or an SO$_3$H or CO$_2$H group or their water-soluble metal salts, or an amino group or water-soluble salts thereof, and *n* and $n^1$ are 1 or 2 or D has the formula

wherein Z$_3$ and $n^1$ are as defined above and at least one of X$_1$, X$_2$, Y$_1$, Y$_2$ and Z$_3$ is an SO$_3$H, CO$_2$H or amino group or a salt thereof.

11. A diarylide pigment composition according to claim 1 wherein component *b* is a dyestuff having the formula

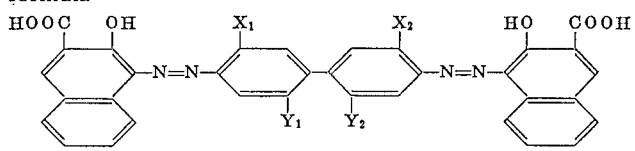

wherein $X_1$, $X_2$, $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof.

12. A diarylide pigment composition according to claim 1 wherein the component *b* is a dyestuff having the formula

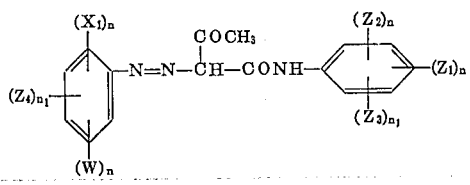

wherein W is H or $NO_2$, $n$ and $n_1$ are 1 or 2, $Z_1$ and $Z_2$ are the same or different and each is H, $CH_3$, $OCH_3$ or Cl, $Z_3$ and $Z_4$ are the same or different and each is H or an $SO_3H$ or $CO_2H$ group or their water-soluble metal salts, or an amino group or water-soluble salts thereof, and $X_1$ is H, $CH_3$, Cl, $OCH_3$ or an $SO_3H$ or $CO_2H$ group or their water-soluble metal salts or an amino group or water-soluble salts thereof.

13. A diarylide pigment composition according to claim 1 wherein component *b* is a dyestuff having the formula

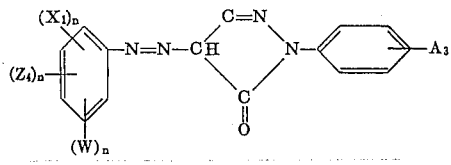

wherein $A_3$ is H, Cl, $CH_3$, amino, $SO_3H$ or $CO_2H$ or a water-soluble salt thereof, W is H or $NO_2$, $n$ is 1 or 2, $X_1$ is H, $CH_3$, Cl, $OCH_3$ or an $SO_3$ or $CO_2H$ group or their water-soluble metal salts or an amino group or water-soluble salts thereof and $Z_4$ is H or an $SO_3H$ or $CO_2H$ group or their water-soluble metal salts, or an amino group or water-soluble salts thereof.

14. A diarylide pigment composition according to claim 1 wherein component *b* is a dyestuff having the formula

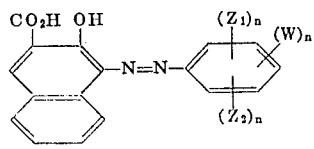

wherein $Z_1$ and $Z_2$ are the same or different and each is H, $CH_3$, $OCH_3$ or Cl, W is H or $NO_2$ and $n$ is 1 or 2.

15. A diarylide pigment composition according to claim 1 wherein component *b* is a dyestuff having the formula

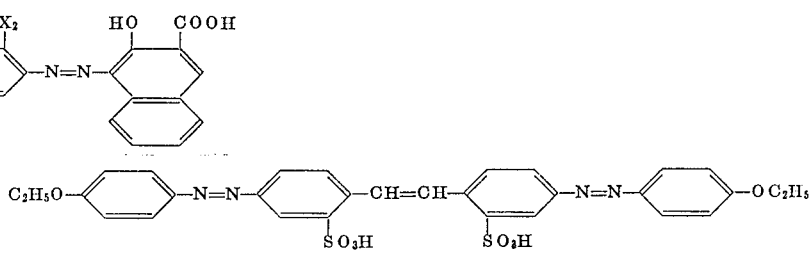

16. A diarylide pigment composition according to claim 1 wherein component *b* is a dyestuff having the formula $$M (N = N P)_n$$

wherein M is an optionally substituted aromatic residue, P is a coupling component and $n$ is 1 or 2 provided that if $n$ is 2 then the two residues need not be identical, and wherein both M and P or either M or P may contain water solubilizing groups.

17. A pigment composition according to claim 1 in which the proportion of the dyestuff component *b* is from 1 to 25 percent by weight.

18. A pigment composition according to claim 17 in which the proportion of the dyestuff component *b* is from 1 to 10 percent by weight.

19. A pigment composition according to claim 1 in which the composition contains a resin or resinous material.

20. A pigment composition according to claim 19 in which the resin is wood rosin or a hydrogenated wood rosin.

21. A composition according to claim 1 in which the composition contains a surface-active agent.

22. A pigment composition according to claim 21 in which the surface-active agent is a naphthalene disulphonic acid/formaldehyde condensate or a long chain alcohol/ethylene oxide condensate.

23. A process of producing a pigment composition as defined in claim 1 comprising incorporating the water-soluble azo dyestuff component *b* into the pigment component *a*.

24. A process of producing a pigment composition according to claim 23 comprising coupling one or more appropriate tetra-azotised pigment benzidine compounds and one or more appropriate pigment coupling agents to yield a pigment having one of the formulas (I), (II) and (III) as defined below:

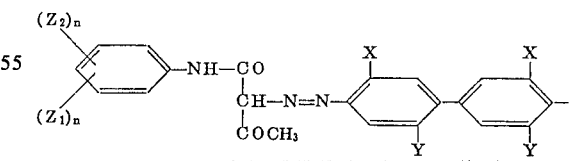

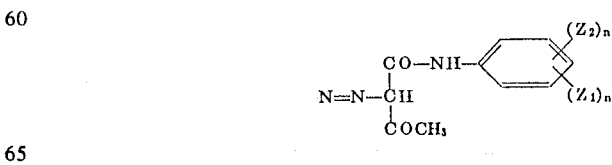

wherein X and Y are the same or different and each is H, $CH_3$, $OCH_3$ or Cl, and $Z_1$ and $Z_2$ are the same or dif-

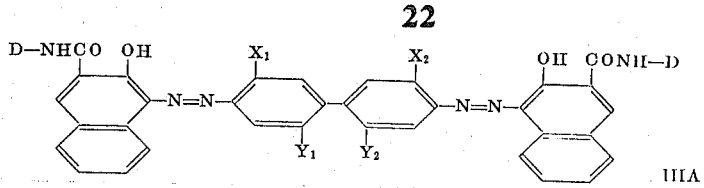

wherein $X_1$, $X_2$, $Y_1$ and $Y_2$ are as defined above, D has the formula ferent and each is H, $CH_3$, $OCH_3$ or Cl and $n$ is 1 or 2,

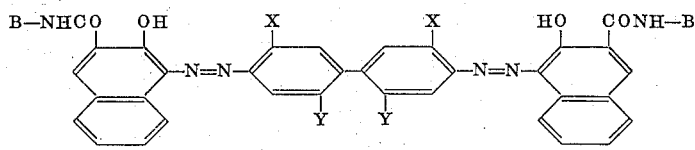

wherein Z and Y have the meanings above and $A_1$ and $A_2$ are the same or different and each is H, or alkyl, halogen and R is alkyl, carbalkoxy or carboxamide residues, and

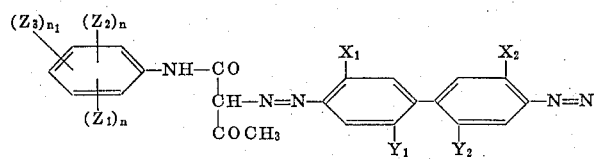

wherein X and Y have the meanings above and B is the group

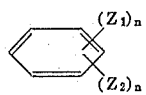

wherein $Z_1$ and $Z_2$ are the same or different and each is H, $CH_3$, $OCH_3$ and Cl or are each an α-naphthyl residue, and $n$ is 1 or 2, and incorporating therein one or more water-soluble dyestuffs having one of the formulas IA, IIA, IIIA, IVA, VA, VIA, VIIA, VIIIA and IXA as defined below:

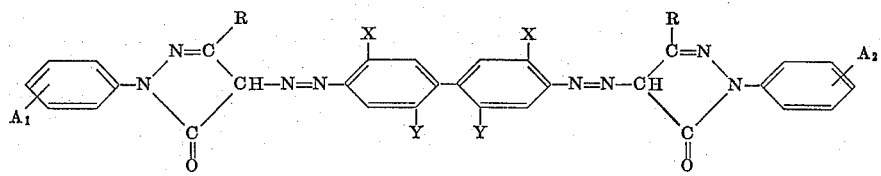

wherein $X_1$, and $X_2$ and $Y_1$ and $Y_2$ are the same or different and each is H, $CH_3$, Cl, $OCH_3$ or an $SO_3H$ or $CO_2H$ group or their water-soluble metal salts or an amino group or water-soluble salts thereof, $Z_1$ and $Z_2$ are the same or different and each is H, $CH_3$, $OCH_3$ or Cl, $Z_3$ and $Z_4$ are the same or different and each is H or an $SO_3H$ or $CO_2H$ group or their water-soluble metal salts, or an amino group or water-soluble salts thereof, and $n_1$ is 1 or 2 and at least one and preferably not more than four of $X_1$, $X_2$ $Y_1$, $Y_2$, $Z_3$ or $Z_4$ is an $SO_3H$, $CO_2H$ or amino group or a salt thereof,

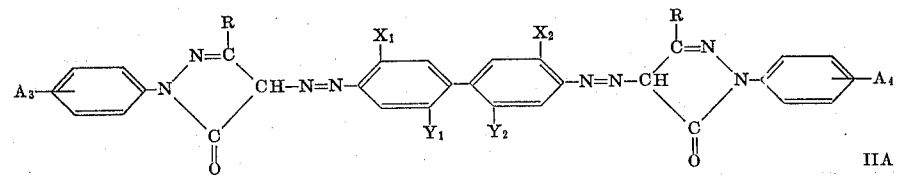

wherein $X_1$, $X_2$ and $Y_1$ and $Y_2$ are as defined above, R is an alkyl, carbalkoxy, carboxamide or $CO_2H$ residue or salts thereof, $A_3$ and $A_4$ are the same or different and each is H, Cl, $CH_3$, amino, $SO_3H$, $CO_2H$ or a water-soluble salt thereof and at least one and preferably not more than four of $X_1$ $X_2$, $Y_1$, $Y_2$, $A_3$, $A_4$ and R is $SO_3H$, $CO_2H$, amino or salt thereof,

II

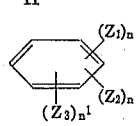

III wherein $Z_1$, $Z_2$ and $Z_3$ and $n$ and $n^1$ have meanings stated above or D has the formula

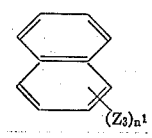

wherein $Z_3$ and $n^1$ are as defined above and at least one of $X_1$, $X_2$, $Y_1$, $Y_2$ and $Z_3$ is an $SO_3H$, $CO_2H$ or amino group or a salt thereof,

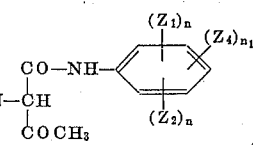

IA

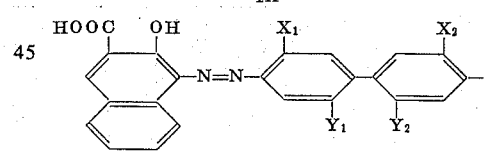

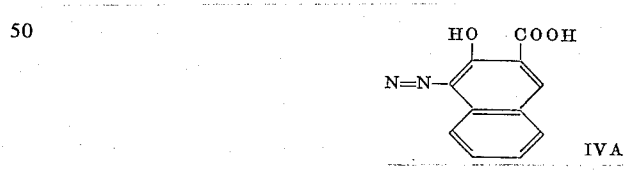

IVA

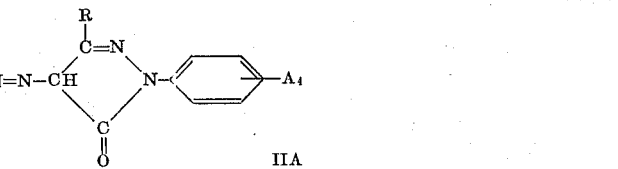

IIA wherein $X_1$, $X_2$ $Y_1$ and $Y_2$ are as defined above or a salt thereof,

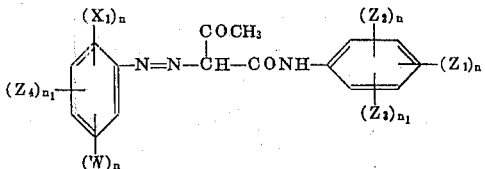

VA wherein W is H or $NO_2$ and $X_1$, $Z_1$ and $Z_4$ are as defined above,

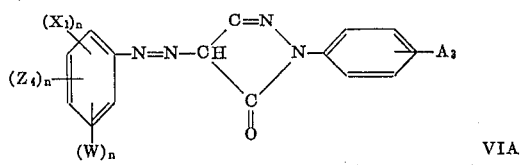

VIA wherein $A_3$, W, $X_1$ and $Z_4$ and n are as defined above,

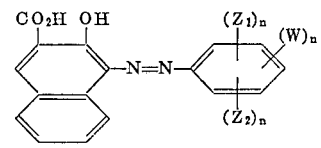

VIIA wherein $Z_1$, $Z_2$, W and n are as defined above,

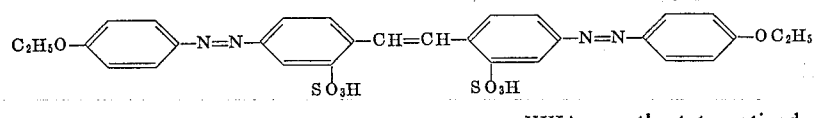

VIIIA and $$M(N=NP)_n$$

IXA wherein M is an optionally substituted aromatic residue, P is a coupling component and n is 1 or 2 provided that if n is 2 then the two residues need not be identical, and wherein both M and P or either M or P contain water solubilizing groups, said dyestuffs being produced by coupling an appropriate diazotized or tetrazotized dyestuff compound with an appropriate dyestuff coupling agent.

25. A process according to claim 24 in which one or more diarylide water-soluble dyestuffs having one of the formulae IA and IVA are incorporated into the pigment.

26. A process according to claim 24 in which up to 25% by weight of one or more tetrazotized sulphonated or carboxylated dyestuff benzidine compounds is added to the tetrazotized pigment benzidine compound and subsequently this mixture is coupled with a pigment coupling agent which is used in an amount which is equal to or in slight excess of the stoichiometric proportion required to produce the diarylide pigment and the dyestuff.

27. A process according to claim 24 in which up to 25 percent by weight of one or more tetrazotized sulphonated or carboxylated dyestuff benzidine compounds is added to pigment coupling agent which is used in an amount which is in excess of the stoichiometric proportion required to produce the diarylide pigment and subsequently, this mixture containing the appropriate excess of coupling component is coupled with the tetrazotized pigment benzidine compound.

28. A process according to claim 24 in which up to 25 percent by weight of one or more tetrazotized sulphonated or carboxylated dyestuff benzidine compounds is added to the pigment coupling reaction mixture during the coupling reaction.

29. A process according to claim 24 in which up to 25 percent by weight of one or more tetrazotized sulphonated or carboxylated dyestuff benzidine compounds is added to pigment coupling reaction mixture after coupling, said pigment coupling reaction mixture containing an appropriate excess of pigment coupling component.

30. A process according to claim 24 in which up to 25 percent by weight of one or more dyestuff coupling components is added to the pigment coupling component and subsequently this mixture is coupled with a tetrazotized pigment benzidine compound which is used in an amount which is in excess of the stoichiometric proportion required to produce the diarylide pigment.

31. A process according to claim 24 in which up to 25 percent by weight of one or more dyestuff copuling components is coupled with the appropriate proportion of tetrazotized pigment benzidine compound, which is used in an amount which is in excess of the stoichiometric proportion required to produce the diarylide pigment, and, subsequently, coupling this mixture and the pigment coupling component with the remainder of the tetrazotized pigment benzidine compound.

32. A process according to claim 24 in which one or more of the water-soluble dyestuffs are added to the tetrazotized pigment benzidine compounds or to the pigment coupling agent before pigment copuling.

33. A process according to claim 24 in which one or more water-soluble dyestuffs are added to the pigment coupling reaction mixture during the coupling reaction or after the coupling reaction.

34. A process according to claim 24 in which one or more water-soluble dyestuffs are added to one or more previously prepared diarylamide pigments.

35. A process according to claim 24 in which the coupling of the tetrazotized pigment benzidine compound and the pigment coupling component is effected in a solution of one or more water-soluble dyestuffs.

36. A process according to claim 24 in which the coupling of the tetrazotized pigment benzidine compound and the pigment coupling component is effected in a solution of one or more water-soluble dyestuffs.

37. A process according to claim 24 in which the water-soluble dyestuff, after incorporation into the pigment, is rendered insoluble at a later stage in the pigment preparation.

38. A process according to claim 37 in which the dyestuff is rendered insoluble by the formation of an insoluble salt of a metal of one of Groups IA, IB, IIA, IIB, IIIA, IIIB, and VIII of the Periodic Table.

39. A process according to claim 38 in which a double decomposition reaction is effected between the sodium salt of the dyestuff and a water-soluble salt of the metal at an alkaline pH value.

40. A process according to claim 38 in which the metal salt is selected from zinc sulphate, magnesium sulphate, barium chloride, aluminum sulphate and calcium chloride.

41. A process according to claim 24 in which a resin or resinous material is incorporated into the pigment composition.

42. A process according to claim 24 in which a surface-active agent is incorporated into the pigment composition.

43. A printing ink containing a pigment composition according to claim 1.

44. A printing ink according to claim 43 in which the printing ink is a letterpress varnish.

* * * * *

Disclaimer 3,776,749.—*Robert Bruce McKay*, Kilmarnock; and *Gordon Frank Bradley*, Paisley, Scotland. DIARYLIDE PIGMET COMPOSITIONS. Patent dated Dec. 4, 1973. Disclaimer filed July 16, 1985, by the assignee, *Ciba-Geigy AG*.

Hereby enters this disclaimer to all claims of said patent.
[*Official Gazette September 24, 1985.*]